(12) United States Patent
Pira et al.

(10) Patent No.: US 11,535,144 B2
(45) Date of Patent: Dec. 27, 2022

(54) TRANSPORTING DEVICE FOR LAUNCHING AND HAULING A BOAT

(71) Applicant: BOAT LIFT S.R.L., Diano d'Alba (IT)

(72) Inventors: Ezio Pira, Diano d'Alba (IT); Alex Cardone, Diano d'Alba (IT)

(73) Assignee: BOAT LIFT S.R.L., Diano d'Alba (IT)

( * ) Notice: Subject to any disclaimer, the term of this patent is extended or adjusted under 35 U.S.C. 154(b) by 976 days.

(21) Appl. No.: 16/328,647

(22) PCT Filed: Aug. 11, 2017

(86) PCT No.: PCT/IB2017/054899
§ 371 (c)(1),
(2) Date: Feb. 26, 2019

(87) PCT Pub. No.: WO2018/042277
PCT Pub. Date: Mar. 8, 2018

(65) Prior Publication Data
US 2020/0391649 A1    Dec. 17, 2020

(30) Foreign Application Priority Data
Aug. 31, 2016    (IT) ........................ 102016000088689

(51) Int. Cl.
*B60P 3/10*    (2006.01)
*B63C 3/12*    (2006.01)
*B63C 3/02*    (2006.01)

(52) U.S. Cl.
CPC .............. *B60P 3/1066* (2013.01); *B63C 3/12* (2013.01); *B60G 2300/04* (2013.01); *B62B 2202/403* (2013.01); *B63C 3/02* (2013.01)

(58) Field of Classification Search
CPC ...... B62D 55/02; B62D 55/04; B62D 55/084; B62D 49/0635; B60P 3/10; B60P 3/1033;
(Continued)

(56) References Cited

U.S. PATENT DOCUMENTS 1,443,963 A * 2/1923 Monsen ................. B62D 55/02
                                                        305/126
3,539,065 A    11/1970 Brownell
(Continued)

FOREIGN PATENT DOCUMENTS

DE    10 2011 115 872 A1    4/2013
EP          1676772 A2 *    7/2006  ............... B07B 1/00
(Continued)

*Primary Examiner* — Benjamin F Fiorello
(74) *Attorney, Agent, or Firm* — Howson & Howson LLP (57) ABSTRACT

A transporting device for launching and hauling boats is provided. The device includes a frame arranged to support a boat hull and is provided with at least two pairs of wheels. Each pair of wheels is formed by two wheels aligned with each other on opposite sides of the frame, and the frame is further provided with one or more tracks. The device is capable of easily and effectively moving both on roads and other hard terrains, and on soft terrains, such as for instance sandy or muddy terrains. According to an embodiment, the wheels and the tracks are mounted on the frame so as to be movable in a direction perpendicular to the plane of the frame itself so that they can be selectively brought into contact with the underlying ground or moved away from ground depending on the kind of terrain on which the device is moving.

11 Claims, 6 Drawing Sheets

(58) Field of Classification Search
CPC ........ B60P 3/1058; B60P 3/1066; B63C 3/12; B62B 2202/403; B62B 3/02
See application file for complete search history.

(56) References Cited

U.S. PATENT DOCUMENTS

| | | | | |
|---|---|---|---|---|
| 4,204,583 | A * | 5/1980 | Toyoura | B62D 55/02 180/6.7 |
| 4,494,766 | A * | 1/1985 | McHugh | B60G 17/0523 410/11 |
| 4,541,498 | A * | 9/1985 | Pitchford | B62D 55/02 180/9.26 |
| 4,915,577 | A | 4/1990 | Fraser | |
| 5,161,814 | A * | 11/1992 | Walker | B60P 1/022 280/43.24 |
| 5,287,938 | A * | 2/1994 | Welling | B62D 55/04 180/9.34 |
| 5,727,474 | A * | 3/1998 | Theurer | E01B 27/00 105/215.1 |
| 6,079,729 | A | 6/2000 | Braun | |
| 6,405,874 | B1 * | 6/2002 | Douglas | B07B 1/005 209/244 |
| 8,636,296 | B1 * | 1/2014 | Gilbert | B62D 55/02 180/9.26 |
| 2001/0015295 | A1 | 8/2001 | Braun | |
| 2010/0247279 | A1 | 9/2010 | Boluda | |
| 2015/0274227 | A1 * | 10/2015 | Aljahmi | B62D 61/12 180/9.3 |
| 2017/0247068 | A1 * | 8/2017 | Ratgen | B62D 49/0635 |

FOREIGN PATENT DOCUMENTS

| | | | |
|---|---|---|---|
| EP | 2402210 A2 | 1/2012 | |
| GB | 2151560 A | 7/1985 | |
| WO | 97/35742 A1 | 10/1997 | |
| WO | 2004/018258 A2 | 3/2004 | |
| WO | WO-2011121529 A1 * | 10/2011 | ............. B60P 3/062 |
| WO | 2015/084172 A1 | 6/2015 | |

* cited by examiner

TRANSPORTING DEVICE FOR LAUNCHING AND HAULING A BOAT

FIELD OF THE INVENTION

The present invention concerns a transporting device for launching and hauling boats, for instance catamarans.

More particularly, the present invention concerns a transporting device capable of transporting a boat from a road to water and vice versa.

BACKGROUND OF THE INVENTION

Transporting devices for launching (i.e. putting into water) and hauling (i.e. bringing back to land) boats are known.

More particularly, devices capable of transporting a boat into and out of water are known, which comprise a frame that supports the boat hull and is mounted on a plurality of wheels.

Said transporting devices can be self-propelled or they are arranged to be trailed by a vehicle.

For instance, documents WO 2004/018258 and U.S. Pat. No. 6,079,729 disclose self-propelled devices for transporting boats, comprising a frame provided with a plurality of wheels. Conversely, document WO 2015/084172 discloses a trailer for transporting boats, comprising a frame provided with a plurality of wheels and also provided with a joint for connection to a vehicle or a tractor.

Devices of such kind allow transporting a boat on a hard terrain and are also capable of being partially submersed for launching and hauling the boat transported, Yet, they are not suitable for transporting a boat on sandy terrains, muddy terrains or, more generally, soft terrains.

Even in case of use of "all terrain" tyres (see in this respect e.g. U.S. Pat. No. 6,079,729), the wheels tend in any case to sink under the action of the weight of the boat in case of transport on soft terrains.

Devices capable of transporting a boat into and out of water are further known from the state of the art, which comprise a frame that supports the boat hull and is mounted on a plurality of tracks. See for instance documents IT 1172661 and WO 2009/056658.

Thanks to the provision of the tracks, said transporting devices are capable of moving on sandy, muddy or, generally, soft terrains without the risk of sinking and remaining blocked. Yet, the provision of the tracks makes such systems scarcely suitable for road transport, except over short distances.

Documents EP 2402210 and WO 97/35742 disclose self-propelled transporting devices for launching and hauling a boat, comprising a frame the rear portion of which supports the boat hull and is mounted on a plurality of tracks, and the front portion of which supports the means for driving and propelling the device and is mounted on a supporting wheel.

In a solution of this kind, the weight of the boat is supported by the frame portion mounted on the tracks, so as to avoid the risk of sinking in case of transport on soft terrain, and the supporting front wheel forms with the tracks a three-point supporting structure and improves the manoeuvrability of the device.

Yet, also such a solution is not suitable for road transport, except over short distances.

BRIEF SUMMARY OF THE INVENTION

It is the main object of the present invention to overcome the limitations of the prior art, by providing a transporting device for launching and hauling boats, which is suitable for transporting a boat on any kind of terrain, and specifically both on hard terrains, more particularly on a road, and on soft terrains, more particularly on sandy or muddy terrains.

The above and other objects are achieved by the transporting device for launching and hauling boats as claimed in the appended claims.

The transporting device for launching and hauling boats according to the invention comprises a frame arranged to support the hull of said boat and provided with at least two pairs of wheels, each pair being formed by two wheels arranged aligned to each other on the opposite sides of said frame, the frame being further provided with one or more tracks.

Thanks to the provision of said pairs of wheels, the device according to the invention is capable of moving on roads and other hard terrains. Thanks to the provision of said tracks, the device according to the invention can move on soft terrains without sinking under the action of the weight of the boat transported.

According to a preferred embodiment of the invention, said wheels and said tracks are mounted on said frame so as to be movable in a direction perpendicular to the plane of the frame itself (i.e. in vertical direction) and they can be brought into contact with the underlying ground or moved away from ground. Thanks to such a feature, the device according to the invention allows choosing every time the configuration that is the most suitable depending on the kind of terrain on which the device is moving.

In case of hard terrain, e.g. a road, the wheels only will preferably be in contact with ground, so that the movement of the device according to the invention is easier and is not slowed down by the provision of the tracks.

On the contrary, in case of soft terrain, e.g. a sandy floor, the tracks can be brought in contact with ground, so as to support the weight of the boat transported and to prevent the transporting device according to the invention from sinking.

Advantageously, the fact that the wheels and the tracks of the transporting device according to the invention are mounted on the frame so as to be movable in a direction perpendicular to the plane of the frame itself can also be exploited in order to change the distance of said frame from ground.

Moreover, the fact that the wheels and the tracks of the transporting device according to the invention are mounted on the frame so as to be movable in a direction perpendicular to the plane of the frame itself can also be exploited in order to adapt the transporting device to possible slopes of the terrain on which it is moving.

In a preferred embodiment of the invention, always in order to make the transporting device suitable for moving on sloping terrains, the tracks are mounted on the frame so as to be pivotable relative to the frame.

The frame of the transporting device according to the invention includes one or more supporting elements for supporting the hull of the boat transported.

According to a preferred embodiment of the invention, said supporting elements are mounted on said frame so as to be movable in a direction perpendicular to the plane of the frame itself (i.e. in vertical direction), so as to make the boat launching and hauling operations easier.

In a preferred embodiment of the invention, the transporting device is a self-propelled device. Yet, in alternative embodiments of the invention, the device can be made as a trailer suitable for being trailed by a tractor or another vehicle.

BRIEF DESCRIPTION OF THE DRAWINGS

Further features and advantages of the transporting device according to the invention will become more apparent from the following detailed description of a preferred embodiment of said transporting device, given by way of non-limiting example with reference to the accompanying drawings, in which.

DETAILED DESCRIPTION OF THE INVENTION

The following detailed description refers to a transporting device for launching and hauling a catamaran. Such an application is in no way to be intended in a limiting sense, and the invention can be applied to launching and hauling a great number of different boats.

Figure 1:
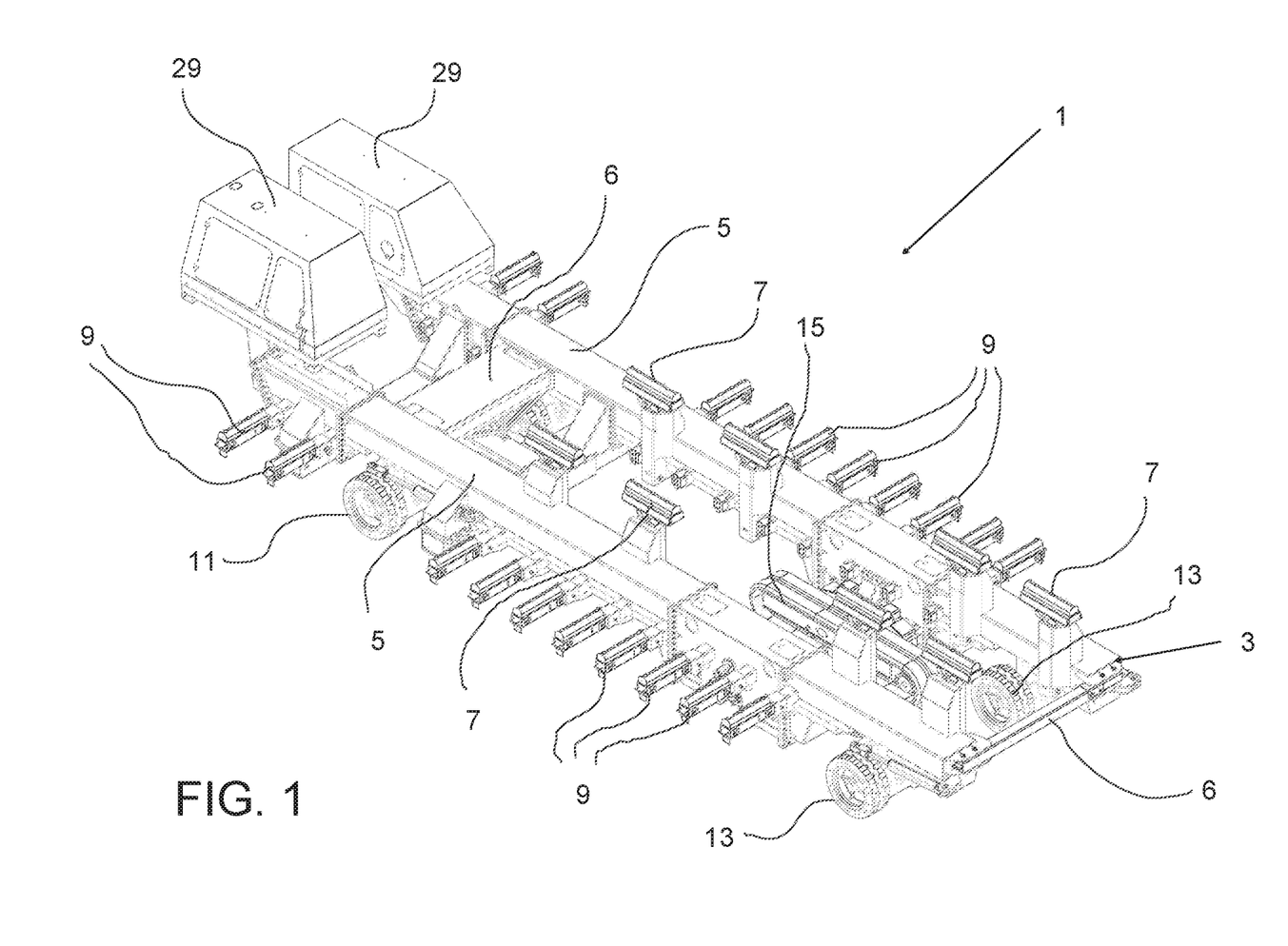
FIG. 1 is a schematic perspective view of a transporting device for launching and hauling a boat according to a preferred embodiment of the invention.
Figure 2:
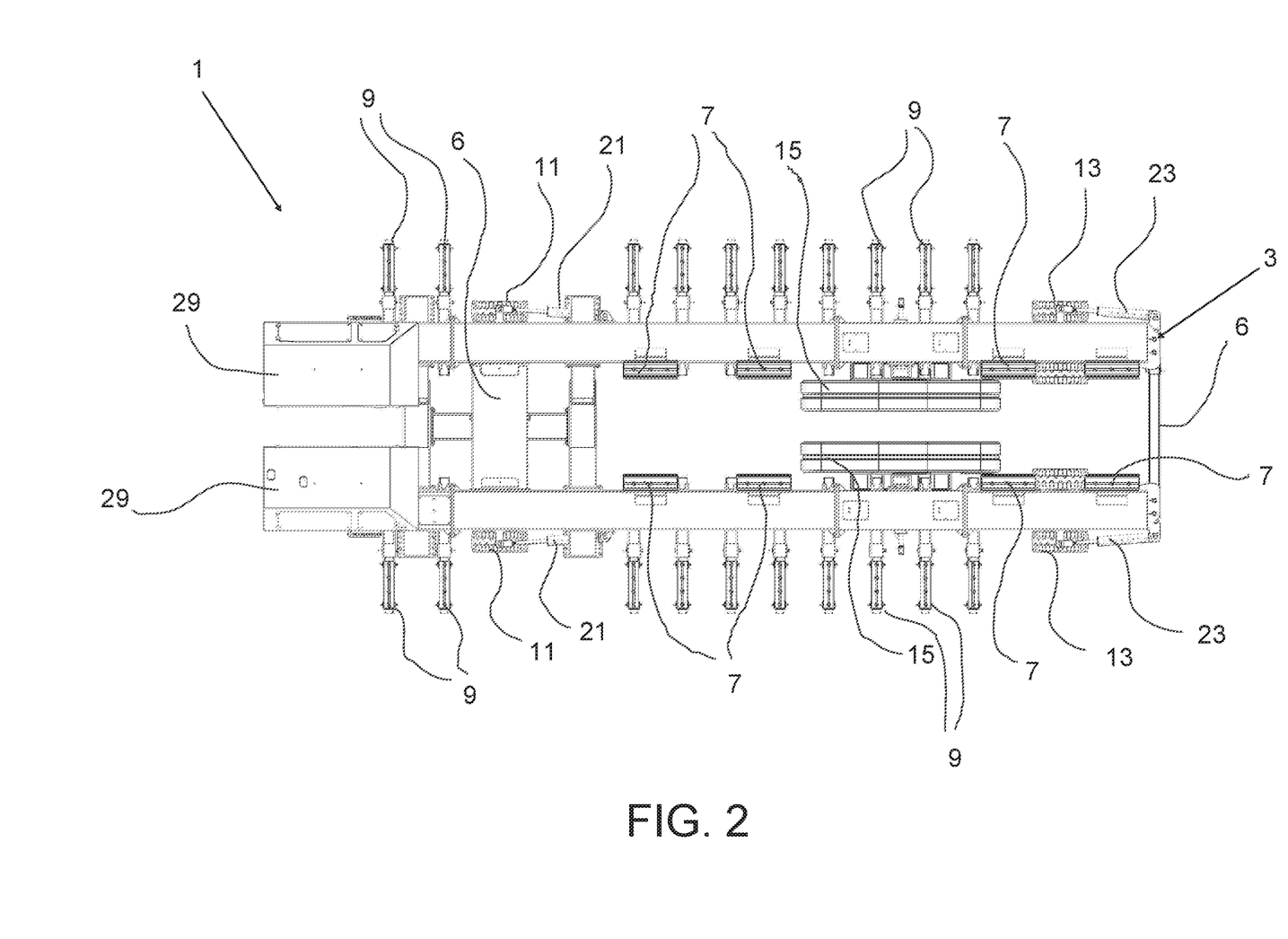
FIG. 2 is a schematic plan view of the transporting device depicted in FIG. 1.

Referring first to FIGS. 1 and 2, there is schematically shown a transporting device according to the invention for launching and hauling a boat, the device being generally denoted by reference numeral 1.

Transporting device 1 comprises a frame 3 including a pair of longitudinal beams 5, parallel to each other and suitably spaced apart from each other, which are mutually connected by cross beams 6.

Supporting elements 7, on the top of which there are defined supporting surfaces arranged to support the hull of a boat, are mounted on each of said longitudinal beams 5.

In the embodiment illustrated herein, four supporting elements 7 are provided for each longitudinal beam. Yet, any suitable number of supporting elements could be provided on each longitudinal beam.

Said supporting elements 7 are distributed over the length of the respective longitudinal beam, so as to adequately support the boat hull.

Preferably, as shown in FIGS. 1 and 2, the same number of supporting elements 7 is provided on both longitudinal beams, and the supporting elements on both longitudinal beams 5 are mutually aligned.

As stated before, the preferred embodiment described and illustrated herein refers to launching/hauling a catamaran, and supporting elements 7 of each longitudinal beam 5 are arranged to support the bottom of a respective side hull of said catamaran.

Each longitudinal beam 5 is moreover provided with a plurality of supporting arms 9 laterally extending towards the outside of frame 3 in order to provide an additional support for the respective side hull of the catamaran transported and for preventing accidental and undesired movements of the catamaran transported in a direction transverse to frame 3 of transporting device 1.

According to the invention, transporting device 1 has at least two pairs of wheels 11, 13, each pair of wheels being formed by two wheels arranged aligned to each other on the opposite sides of said frame 3, i.e. the device has at least two pairs of wheels formed by two wheels mounted aligned to each other on respective longitudinal beams 5.

In the embodiment illustrated herein, two pairs of wheels are provided, namely a pair of front wheels 11 and a pair of rear wheels 13. Each longitudinal beam 5 therefore will carry a respective front wheel 11 and a respective rear wheel 13, front wheels 11, as well as rear wheels 13, being aligned to each other.

Front wheels 11 and/or rear wheels 13 can be advantageously made as steering wheels.

Preferably, said front wheels 11 and said rear wheels 13 will be equipped with "all terrain" tyres.

According to the invention, transporting device 1 further has at least one track mounted on frame 3.

In the embodiment illustrated herein, two tracks 15 are provided, and said tracks are mounted each on a respective longitudinal beam 5 and are aligned to each other. In an alternative embodiment, a single track, centrally arranged between longitudinal beams 5, could be provided. In a different alternative embodiment, more tracks could be provided for each longitudinal beam 5, the tracks carried by different longitudinal beams being preferably aligned to each other.

Thanks to the simultaneous provision both of wheels 11, 13 and of tracks 15, transporting device 1 according to the invention is suitable for easily and effectively moving both on hard terrains, more particularly on a road, and on soft terrains, more particularly on sandy or muddy terrains. In this manner, the boat transported can be easily and effectively brought from road directly into the water (for launching) and vice versa (for hauling).

Figure 3:
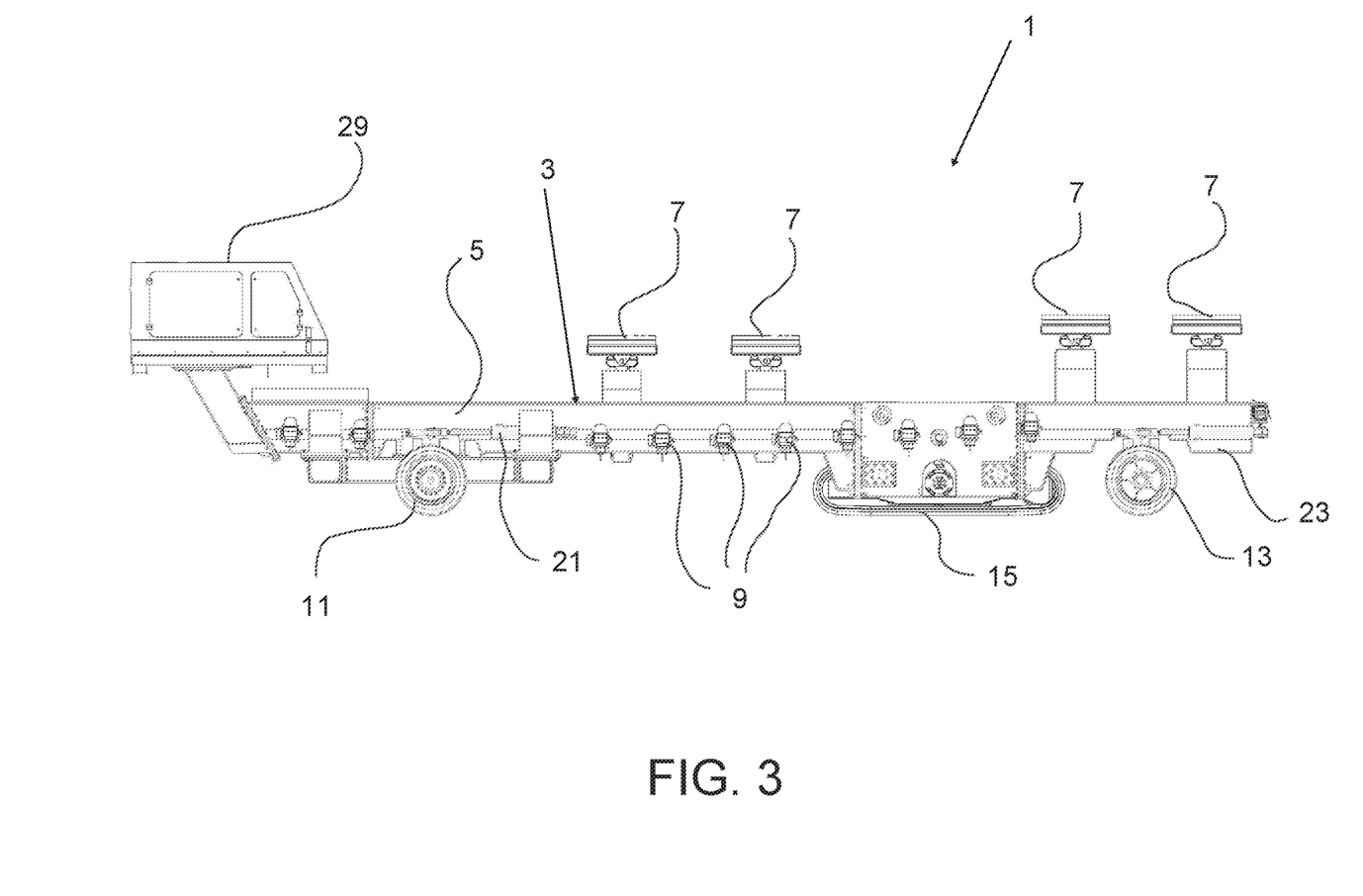
FIG. 3 is a schematic side view of the transporting device depicted in FIG. 1, shown in a first possible configuration.
Figure 4:
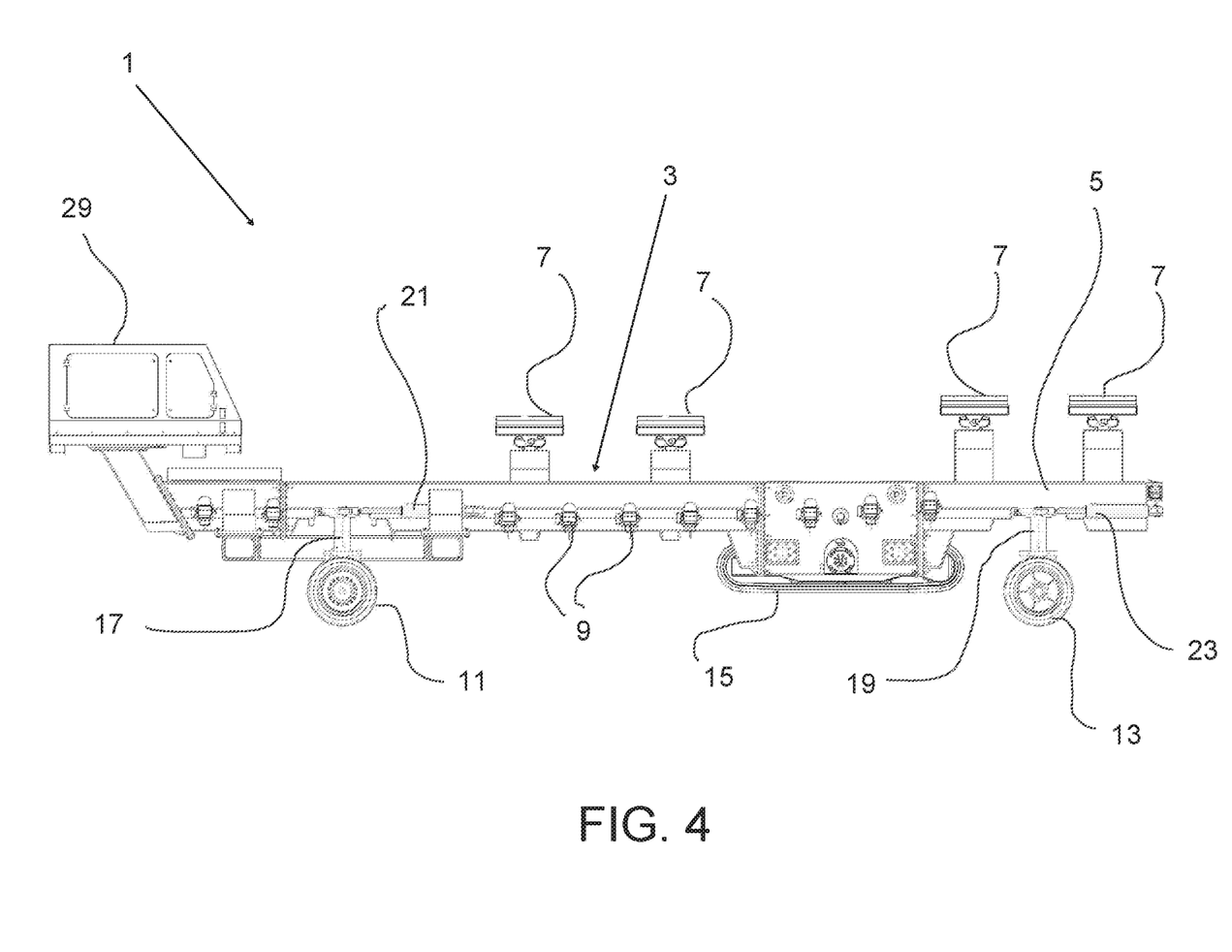
FIG. 4 is a schematic side view of the transporting device depicted in FIG. 1, shown in a second possible configuration.
Figure 5:
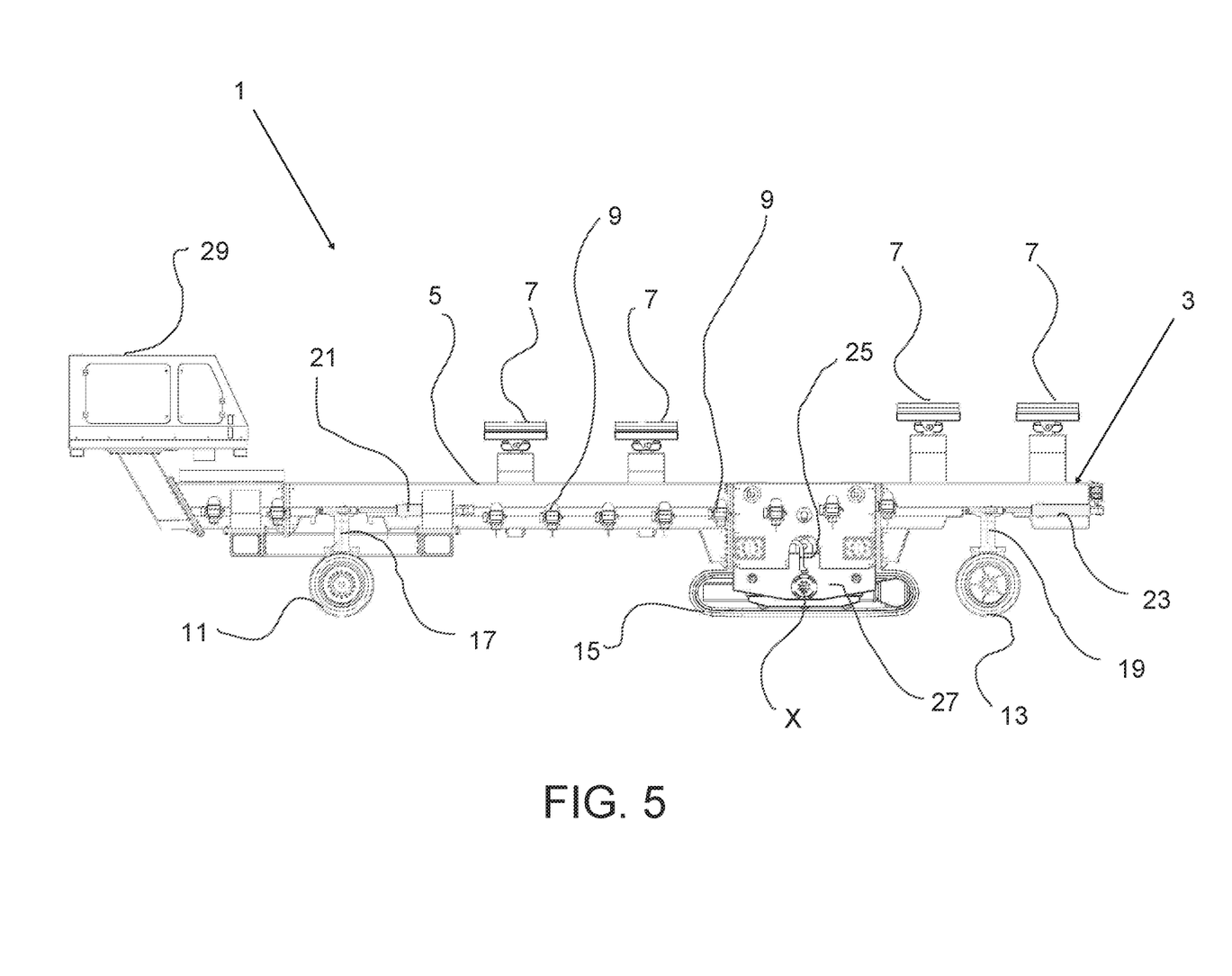
FIG. 5 is a schematic side view of the transporting device depicted in FIG. 1, shown in a third possible configuration.

Referring now to FIGS. 3 to 5, according to a preferred embodiment of the invention wheel pairs 11, 13 are mounted on longitudinal beams 5 so as to be movable relative to frame 3 in a direction perpendicular to the plane of said frame, i.e. in vertical direction.

To this end, wheels 11, 13 are mounted on the respective longitudinal beams 5 by means of respective telescopic arms 17, 19, which are movable from a retracted position to an extended position and vice versa. Actuating members, such as for instance cylinders 21, 22, are provided for actuating the movement of telescopic arms 17, 19 from one position to the other.

According to said preferred embodiment of the invention, also tracks 15 are mounted on longitudinal beams 5 so as to be movable relative to frame 3 in a direction perpendicular to the plane of said frame, i.e. in vertical direction.

To this end, tracks 15 are mounted on the respective longitudinal beams 5 by means of respective articulated arms 25 that can move said tracks from a retracted position to an extended position and vice versa.

Thanks to such a feature, the transporting device can take a plurality of different configurations that are shown in FIGS. 3 to 5. More specifically:

FIG. 3 shows a configuration in which wheels 11, 13 are in retracted position and tracks 15 also are in retracted position;

FIG. 4 shows a configuration in which wheels 11, 13 are in extended position and tracks 15 are in retracted position;

FIG. 5 shows a configuration in which wheels 11, 13 are in extended position and tracks 15 also are in extended position.

Such a structure of wheels 11, 13 and tracks 15 of transporting device 1 according to the invention entails several and evident advantages.

First, said wheels 11, 13 and said tracks 15 can be selectively brought into contact with the underlying ground or moved away from ground, so as to choose every time the configuration that is the most suitable depending on the kind of terrain on which the device is moving.

For instance, the configuration shown in FIG. 4, in which only wheels 11, 13 are in contact with ground and tracks 15 are raised, is particularly suitable for movement on a hard terrain, e.g. on a road.

On the contrary, the configurations shown in FIGS. 3 and 5, in which also tracks 15 are in contact with ground, are particularly suitable for movement on a soft terrain, e.g. on a sandy floor.

Second, the fact that wheels 11, 13 and tracks 15 are movably mounted on longitudinal beams 5 can be exploited in order to change the distance of frame 3 from the terrain on which transporting device 1 is moving.

For instance, in the configuration shown in FIG. 3, frame 3 of transporting device 1 is at a lower distance from the underlying ground shorter than in the configuration shown in FIG. 5.

Third, the fact that wheels 11, 13 and tracks 15 are movably mounted on longitudinal beams 5 can be exploited in order to adapt the transporting device to possible slopes of the terrain on which it is moving.

For instance, in case of a rising terrain, front wheels 11 can be kept in retracted position and rear wheels 13 can be kept in extended position. In case of a descending terrain, the reverse configuration can be adopted, with front wheels 11 in extended position and rear wheels 13 in retracted position.

In order to optimise the movement of transporting device 1 according to the invention on sloping terrains, in the preferred embodiment shown in the Figures each track 15 is moreover mounted on the respective longitudinal beam 5 so as to be rotatable about a rotation axis that is parallel to the plane of the frame and perpendicular to said longitudinal beam, so the track is pivotable relative to the longitudinal beam. To this end, each track 15 is mounted on the respective longitudinal beam 5 through a bracket 27. Bracket 27 is fixedly connected to articulated arm 25 moving track 15 from the retracted position to the extended position and vice versa, and track 15 is mounted on said bracket 27 so as to be rotatable about a rotation axis X.

Advantageously, tracks 15 can be mounted on the respective longitudinal beams 5 so as to be rotatable also about a rotation axis perpendicular to the plane of the frame, in order to favour the manoeuvrability of the whole device.

In the embodiment illustrated herein, transporting device 1 is a self-propelled device and includes one or more driving units 29 for driving wheels 11, 13 and/or tracks 15, in order to move the device itself.

Said driving units include an engine, e.g. an internal combustion engine such as a diesel engine, and a transmission system for transmitting motion to said wheels and/or said tracks.

In the embodiment illustrated herein, driving units 29 also drive the movements of wheels 11, 13 and tracks 15 in a direction perpendicular to the plane of frame 3.

In alternative embodiments of the invention, the device could be made as a trailer. In this case, driving units 29 will however be provided in order to drive the movements of wheels 11, 13 and tracks 15 in a direction perpendicular to the plane of frame 3, if such movements are provided for.

As shown in FIGS. 1 and 2, in the embodiment illustrated herein, transporting device 1 includes two separate driving units 29, one for each longitudinal beam 5, what advantageously allows separately controlling wheels 11, 13 and track 15 of each longitudinal beam. Yet, a single driving unit common to both longitudinal beams 5 could even be provided.

Figure 6:
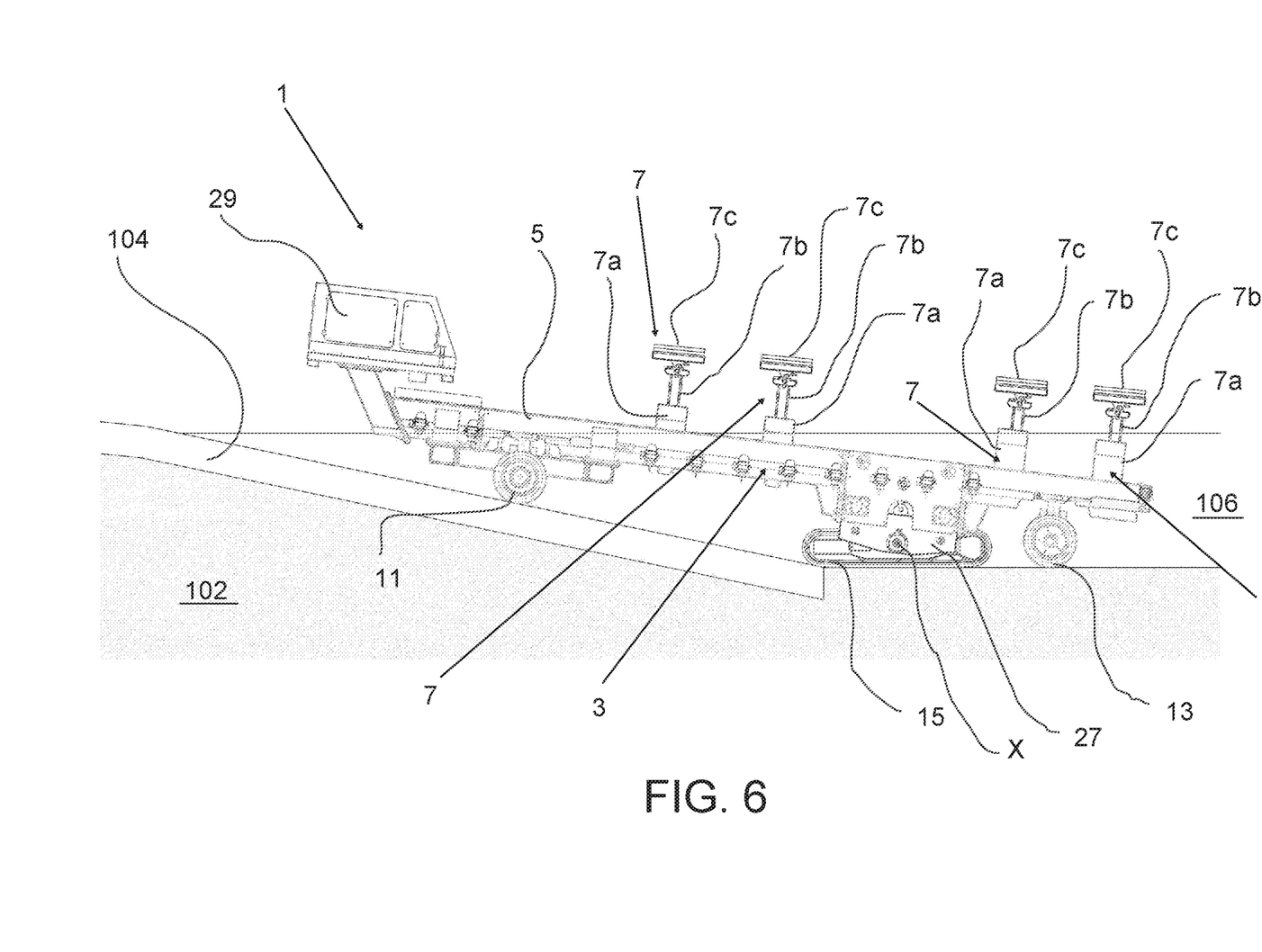
FIG. 6 is a schematic side view of the transporting device depicted in FIGS. 1 to 5, partially submersed for launching/hauling a boat.

FIG. 6 schematically shows the application of transporting device 1 to launching/hauling a boat in case of a sandy floor 102 and assuming the existence of a ramp 104 of cement or other hard material. In FIG. 6, transporting device 1 is shown partially submersed in water 106.

The advantage resulting from transporting device 1 according to the invention being equipped both with pairs of wheels 11, 13 and with tracks 15 is immediately apparent from FIG. 6.

Moreover, the advantage of providing for wheels 11, 13 and tracks 15 being movable in a direction perpendicular to the plane of frame 3 and for tracks 15 being further mounted so as to be pivotable relative to said frame 3 is immediately apparent.

FIG. 6 further shows that supporting elements 7 on which the side hulls of the catamaran transported are supported are preferably adjustable in height. Each supporting element 7 comprises a base 7a that is fixedly attached to the respective beam 5 and a telescopic rod 7b that carries supporting surface 7c and that can move from a retracted position (as shown in FIGS. 1 to 5) to an extended position (shown in FIG. 6), what makes the operations of launching and hauling the catamaran transported considerably easier.

More particularly, launching a catamaran or another boat by means of transporting device 1 according to the invention takes place in the following way:
- the boat is placed on the transporting device so that the hull(s) rest(s) on supporting elements 7, which are kept with their telescopic rods in extended position;
- as long as the transporting device is to move on a hard terrain (for instance on a road or a cement ramp), wheels 11, 13 are kept in extended position and tracks 15 are kept in retracted position, so that they are not in contact with ground;
- when the transporting device arrives on a soft terrain (for instance a sandy shore or a sandy floor), tracks 15 are brought to the extended position, so as to prevent the transporting device from sinking;
- once the device is in the water, the telescopic rods of supporting elements 7 are brought to the retracted position, so that the boat transported is put in water.

Hauling the boat by means of transporting device 1 according to the invention comprises the same operations, performed in the reverse order.

From what has been described and shown it is clearly apparent that the invention attains the aim set forth above.

It is moreover clearly apparent that the detailed description provided herein jointly with the accompanying drawings in connection with a preferred embodiment of the invention has been given only by way of example and that several changes and modifications in the reach of the skilled in the art are possible without departing from the scope of the invention as defined by the appended claims.

The invention claimed is:

1. A transporting device for launching and hauling a boat, which device comprises a frame including a pair of longitudinal beams, parallel to each other and spaced apart from each other, each of the longitudinal beams having a respective longitudinal axis, each of the longitudinal beams carrying one or more supporting elements arranged to support the boat, wherein the transporting device is provided with at least two pairs of wheels, including a pair of front wheels and a pair of rear wheels, each pair of wheels being formed by two wheels arranged aligned to each other on opposite sides of the frame, each pair of wheels being formed by two wheels, which are steerable wheels mounted aligned to each other on a respective one of the longitudinal beams, whereby each longitudinal beam carries a respective front wheel and a respective rear wheel, the front wheels of the pair of front wheels being aligned to each other and the rear wheels of the pair of rear wheels being aligned to each other, wherein the transporting device is further provided with at least two tracks mounted on the frame, each of the tracks being mounted on a respective one of the longitudinal beams, each of the tracks being mounted between the front wheel and rear wheel on a respective one of the longitudinal beams along the longitudinal axis of the respective one of the longitudinal beams, and wherein the wheels and the tracks are mounted on the longitudinal beams so as to be movable relative to the frame in a direction perpendicular to the plane of the frame, whereby the wheels and the tracks can be selectively brought into contact with the underlying ground or moved away from ground, so that a configuration that is most suitable depending on a kind of terrain on which the device is moving is selectable.

2. The transporting device according to claim 1, wherein each of the wheels is mounted on the frame by means of a corresponding telescopic arm that is movable from a retracted position to an extended position and vice versa.

3. The transporting device according to claim 2, wherein each of the tracks is mounted on the frame by means of a corresponding articulated arm that is arranged so as to make the corresponding track move from a retracted position to an extended position and vice versa.

4. The transporting device according to claim 3, wherein the tracks are mounted on the frame so as to be pivotable about a rotation axis which is parallel to the plane of the frame and perpendicular to the longitudinal beams.

5. The transporting device according to claim 4, wherein the transporting device is a self-propelled device and comprises one or more driving units for driving the wheels and/or the tracks for making the transporting device move.

6. The transporting device according to claim 4, wherein each of the supporting elements comprises a base that is fixedly attached to the respective beam and a telescopic rod that carries the supporting surface arranged to support the boat and that is movable from a retracted position to an extended position, and vice versa.

7. The transporting device according to claim 1, wherein each of the tracks is mounted on the frame by means of a corresponding articulated arm that is arranged so as to make the corresponding track move from a retracted position to an extended position and vice versa.

8. The transporting device according to claim 1, wherein the tracks are mounted on the frame so as to be pivotable about a rotation axis which is parallel to the plane of the frame and perpendicular to the longitudinal beams.

9. The transporting device according to claim 1, wherein the transporting device is a self-propelled device and comprises one or more driving units for driving the wheels and/or the tracks for making the transporting device move.

10. The transporting device according to claim 1, wherein each of the supporting elements comprises a base that is fixedly attached to the respective beam and a telescopic rod that carries the supporting surface arranged to support the boat and that is movable from a retracted position to an extended position, and vice versa.

11. The transporting device according to claim 1, wherein each track is mounted on the respective longitudinal beam so as to be rotatable about a rotation axis that is parallel to the plane of the frame, in order to favor the maneuverability of the device.

* * * * *